United States Patent
Joseph et al.

(10) Patent No.: US 10,059,870 B2
(45) Date of Patent: Aug. 28, 2018

(54) ACID-SOLUBLE CEMENT COMPOSITION

(71) Applicant: Halliburton Energy Services, Inc., Houston, TX (US)

(72) Inventors: Trissa Joseph, Pune (IN); Krishna Ravi, Kingwood, TX (US); Sandip Prabhakar Patil, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 6 days.

(21) Appl. No.: 15/524,465

(22) PCT Filed: Dec. 2, 2014

(86) PCT No.: PCT/US2014/068170
§ 371 (c)(1),
(2) Date: May 4, 2017

(87) PCT Pub. No.: WO2016/089379
PCT Pub. Date: Jun. 9, 2016

(65) Prior Publication Data
US 2017/0321107 A1    Nov. 9, 2017

(51) Int. Cl.
| | | |
|---|---|---|
| *E21B 33/138* | (2006.01) | |
| *C09K 8/504* | (2006.01) | |
| *C09K 8/46* | (2006.01) | |
| *C04B 28/04* | (2006.01) | |
| *C04B 40/00* | (2006.01) | |
| *E21B 29/02* | (2006.01) | |
| *E21B 21/00* | (2006.01) | |
| *E21B 33/16* | (2006.01) | |

(52) U.S. Cl.
CPC ............ *C09K 8/5045* (2013.01); *C04B 28/04* (2013.01); *C04B 40/0092* (2013.01); *C09K 8/46* (2013.01); *E21B 29/02* (2013.01); *E21B 33/138* (2013.01); *E21B 21/003* (2013.01); *E21B 33/16* (2013.01)

(58) Field of Classification Search
CPC .......... C04B 28/02; C09K 8/46; C09K 8/467; C09K 8/428; E21B 33/16; E21B 33/13; E21B 33/134; E21B 33/138; E21B 33/14
See application file for complete search history.

(56) References Cited

U.S. PATENT DOCUMENTS

| | | |
|---|---|---|
| 7,431,086 B2 | 10/2008 | Lewis et al. |
| 2009/0032252 A1 | 2/2009 | Boney et al. |
| 2010/0282466 A1 | 11/2010 | Brenneis et al. |
| 2011/0028607 A1 | 2/2011 | Morgan et al. |
| 2014/0076204 A1 | 3/2014 | Brenneis et al. |

OTHER PUBLICATIONS

International Search Report and Written Opinion dated Aug. 12, 2015; International PCT Application No. PCT/US2014/068170.

*Primary Examiner* — Zakiya W Bates
(74) *Attorney, Agent, or Firm* — McGuireWoods LLP

(57) ABSTRACT

A cement composition for use in a well that penetrates a subterranean formation comprising: cement; and water, wherein the water is in a concentration in the range of about 220% to about 800% by weight of the cement, wherein the cement composition is acid soluble. A method of treating a subterranean formation comprising: introducing the cement composition into the subterranean formation; allowing the composition to set; and contacting the set cement composition with an acid.

18 Claims, 2 Drawing Sheets

ACID-SOLUBLE CEMENT COMPOSITION

TECHNICAL FIELD

Cement compositions can be used in a variety of oil or gas operations. Cement compositions can be used to prevent lost circulation into a subterranean formation. An acid-soluble cement composition can be used as a lost-circulation material.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
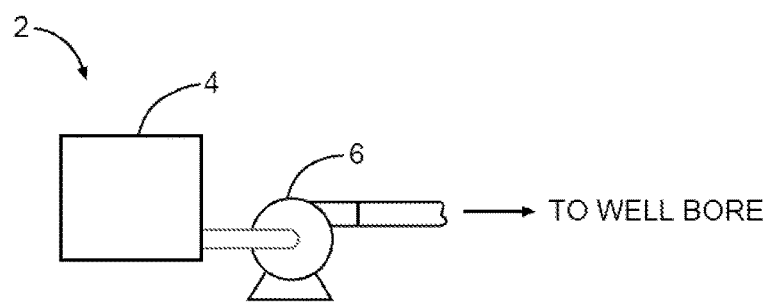
FIG. 1 illustrates a system for preparation and delivery of a cement composition to a wellbore according to certain embodiments.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, a geothermal well, or a high-temperature and high-pressure (HTHP) well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore to form a cement sheath. As used herein, a "cement composition" is a mixture of at least cement and water that develops compressive strength or sets. A cement composition is generally a slurry in which the water is the external phase of the slurry and the cement (and any other insoluble particles) is the internal phase. The external phase of a cement composition can include dissolved solids. As used herein, the word "cement" means a binder, which is a dry substance that develops compressive strength and can set and can bind other materials together when mixed with water.

Cement compositions can be used to prevent fluid loss, known as lost circulation, into the subterranean formation. By way of example, vugs and fissures can be located in a subterranean formation. The vugs and fissures are highly-permeable areas whereby some of the liquid portion of a base fluid can undesirably flow into these highly-permeable areas. To help prevent or reduce the amount of fluid lost into the formation, a lost-circulation fluid can be used. A lost-circulation fluid can be a cement composition. The cement composition can flow into the highly-permeable areas. The cement composition can then set within the areas to more permanently fill the voids and reduce or eliminate fluid loss into the subterranean formation.

However, it may be desirable to restore fluid communication in the highly-permeable areas. Thus, there is a need for improved cement compositions that can be dissolved after setting in order to help restore fluid communication within the subterranean formation or well.

It is desirable for a cement composition to have certain properties, such as a desired rheology, thickening time, and compressive strength.

If any laboratory test (e.g., compressive strength) requires the step of mixing, then the cement composition is mixed according to the following procedure. The water is added to a mixing container and the container is then placed on a mixer base. The motor of the base is then turned on and maintained at 4,000 revolutions per minute "rpm" (+/−200 rpm). The cement and any other ingredients are added to the container. The ingredients and cement can be added at different times during the mixing. After all the ingredients have been added to the water in the container, a cover is then placed on the container, and the cement composition is mixed at 4,000 rpm (+/−200 rpm) for 1 min.

It is also to be understood that if any laboratory test requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

A cement composition can be acid soluble. As used herein, the acid solubility of a cement composition is tested as follows. The cement composition is mixed. The cement composition was placed into a 2 cubic inch curing mould until the cement composition was set. The set cement cube was then removed from the mould and weighed to obtain the "initial" weight. The cement cube was then immersed in a stated acid solution at a specified temperature, which could simulate the bottomhole temperature of a well. The cement cube was removed from the acid solution at a variety of times and weighed to obtain a "final" weight at that time. The percent solubility was calculated according to the following equation:

$$\% \text{ acid solubility} = \frac{\text{initial} - \text{final}}{\text{initial}} * 100\%$$

As used herein, a cement composition having a percent acid solubility of greater than at least 10% in 15 minutes is "acid soluble."

It is necessary for a cement composition to remain pumpable during introduction into the well and until the cement composition is situated in the portion of the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the composition to set.

As used herein, the "thickening time" is how long it takes for a cement composition to become unpumpable at a specified temperature and pressure. The pumpability of a cement composition is related to the consistency of the cement composition. The consistency of a cement composition is measured in Bearden units of consistency (Bc), which is a dimensionless unit with no direct conversion factor to the more common units of viscosity. As used herein, a cement composition becomes "unpumpable" when the consistency of the substance reaches 70 Bc. As used herein, the consistency of a cement composition is measured according to ANSI/API 10B-2 section 9, Recommended Practice for Testing Well Cements, Second Edition, April 2013 as follows. The cement composition is mixed. The cement composition is then placed in the test cell of a High-Temperature, High-Pressure (HTHP) consistometer, such as a FANN® Model 275 or a Chandler Model 8240, at a specified temperature and pressure. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the cement composition has been mixed and at a specified temperature and pressure. Compressive strength can be measured, for example, at a time of 24 hours. According to ANSI/API 10B-2, Recommended Practice for Testing Well Cements, compressive strength can be measured by either a destructive method or non-destructive method.

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer "UCA" and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a specified temperature and pressure. As used herein, the "initial setting time" is the difference in time between when the dry ingredients are added to the water and when the cement composition is initially set.

As used herein, the term "set," and all grammatical variations thereof, are intended to mean the process of becoming hard or solid by curing. As used herein, the "setting time" is the difference in time between when the dry ingredients are added to the water and when the cement composition has set at a specified temperature. It can take up to 48 hours or longer for a cement composition to set.

According to certain embodiments, a cement composition for use in a well that penetrates a subterranean formation comprises: cement; and water, wherein the cement composition is acid soluble.

According to other embodiments, a method of treating a subterranean formation comprises: introducing the cement composition into the subterranean formation; allowing the composition to set; and contacting the set cement composition with an acid.

It is to be understood that the discussion of preferred embodiments regarding the cement composition or any ingredient in the cement composition, is intended to apply to the composition embodiments and the method embodiments. Any reference to the unit "gallons" means U.S. gallons.

The cement composition includes cement. The cement can be Class A cement, Class C cement, Class G cement, Class H cement, and any combination thereof. The cement can be, without limitation, Portland cement, Gypsum cement, Joppa cement, Dyckerhoff cement, Slag cement, high aluminate cements, such as calcium-aluminate cements, calcium magnesia cements, and any combination thereof.

The cement composition includes water. The water can be selected from the group consisting of freshwater, brackish water, seawater, and saltwater, in any combination thereof in any proportion. The composition can also include a water-soluble salt. The salt can be selected from the group consisting of sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The cement composition is acid soluble. The cement composition can have a percent acid solubility greater than 10% at a time of 10 minutes (min) in a 15% hydrochloric acid (HCl) solution. The cement composition can also have a percent acid solubility greater than 45% at a time of 60 min in a 15% HCl solution. The cement composition can also have a percent acid solubility greater than 60% at a time of 120 min in a 15% HCl solution. According to certain embodiments, the percentage of acid solubility of the set cement composition is at least 50%, or alternatively at least 70% at the bottomhole temperature and pressure of the subterranean formation after being contacted with an acid for 180 min. As used herein, the term "bottomhole" means the location within the subterranean formation where the cement composition is situated. According to certain other embodiments, the percentage of acid solubility is sufficient to remove a desired amount of the set cement composition from the subterranean formation.

The amount of water can be selected to provide the desired percentage of acid solubility under the conditions stated. Without being limited by theory, it is believed that it is the concentration of the water that provides the acid solubility to the cement composition. It is believed that the higher the concentration of the water, the higher the permeability of the set cement composition. This higher permeability allows an acid to flow into and through the set cement composition to dissolve the cement. According to certain embodiments, the amount of water is selected to provide a sufficient amount of permeability to the set cement composition. The sufficient amount of permeability can be selected to provide the desired percentage of acid solubility. According to certain other embodiments, the water can be in a concentration of at least 25 gallons per sack (gal/sk) of the cement, alternatively at least 220% by weight of the cement (bwoc). The water can also be in a concentration in the range of about 25 to about 90, alternatively about 30 to about 70, gal/sk. The water can also be in a concentration in the range of about 220% to about 800%, alternatively about 300% to about 700%, bwoc.

The cement composition can have a density of at least 9 pounds per gallon (ppg) (1.1 kilograms per liter "kg/L"). The cement composition can have a density in the range of about 9 to about 12 ppg (about 1.1 to about 1.4 kg/L). The density of the cement composition can also be selected based on the desired amount of water to be included in the cement composition.

The cement composition can have a thickening time in the range of about 5 to about 15 hours, alternatively of about 10 to about 12 hours, at a temperature of 80° F. (27° C.). The cement composition can have a thickening time in the range of about 5 to about 15 hours, alternatively of about 10 to about 12 hours, at the bottomhole temperature and pressure of the subterranean formation.

The cement composition can also have a compressive strength greater than 50 psi (0.3 MPa) at the bottomhole temperature of the subterranean formation. The cement composition can have a setting time of less than 48 hours, preferably less than 24 hours, at the bottomhole temperature of the subterranean formation.

The cement composition can further include other additives. Examples of other additives include, but are not limited to, a viscosifier or suspending agent, a filler, a lost-circulation material, a fluid loss additive, a strength enhancer, a friction reducer, a light-weight additive, a defoaming agent, a high-density additive, a mechanical property enhancing additive, a filtration-control additive, a thixotropic additive, a set retarder, a set accelerator, and combinations thereof. According to certain embodiments, some or all of the other additives are also acid soluble. Accordingly, this can help to make the final cement composition more acid soluble compared to a cement composition that does not contain acid soluble additives.

The cement composition can include a viscosifier or suspending agent. Suitable examples of commercially-available viscosifiers or suspending agents include, but are not limited to, SA-1015™, THERMA-VIS™, FWCA™, and WG-18™, marketed by Halliburton Energy Services, Inc. The viscosifier or suspending agent can be in a concentration in the range of about 0.01% to about 10% bwoc.

The cement composition can include a filler. Suitable examples of fillers include, but are not limited to, fly ash, sand, clays, and vitrified shale. The filler can be in a concentration in the range of about 1% to about 50% bwoc.

The cement composition can include a lost-circulation material. Suitable examples of commercially-available lost-circulation materials include, but are not limited to, BARACARB® sized ground marble (acid soluble) and WELLLIFE®-734, marketed by Halliburton Energy Services, Inc. The lost-circulation material can be in a concentration in the range of about 5% to about 50% bwoc.

The cement composition can include a fluid loss additive. Suitable examples of commercially-available fluid loss additives include, but are not limited to, HALAD®-344, HALAD®-300L, and HALAD®-23, marketed by Halliburton Energy Services, Inc. The fluid loss additive can be in a concentration in the range of about 0.5% to about 20% bwoc.

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, and SCR-500™. The set retarder can be in a concentration in the range of about 0.05% to about 10% bwoc.

The cement composition can include a set accelerator. Suitable examples of commercially-available set accelerators include, but are not limited to, nano silica, and ECONO-LITE™ or GASCON 469™, marketed by Halliburton Energy Services, Inc. The set accelerator can be in a concentration in the range of about 0.05% to about 15% bwoc.

The cement composition can include a strength-retrogression additive. Suitable examples of commercially-available strength-retrogression additives include, but are not limited to, and are marketed by Halliburton Energy Services, Inc. under the tradenames SSA-1™ and SSA-2™. The strength-retrogression additive can be in a concentration in the range of about 5% to about 50% bwoc.

The cement composition can include a light-weight additive. Suitable examples of commercially-available light-weight additives include, but are not limited to, and are marketed by Halliburton Energy Services, Inc. under the tradenames SPHERELITE® and LUBRA-BEADS® FINE; and available from 3M in St. Paul, Minn. under the tradenames HGS2000™, HGS3000™, HGS4000™, HGS5000™, HGS6000™, HGS10000™, and HGS18000™ glass bubbles. The light-weight additive can be in a concentration in the range of about 5% to about 50% bwoc.

Commercially-available examples of other additives include, but are not limited to, and are marketed by Halliburton Energy Services, Inc. under the tradenames: HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

FIG. 1 illustrates a system that can be used in the preparation of a cement composition and delivery to a wellbore according to certain embodiments. As shown, the cement composition can be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 can be located on one or more cement trucks. In some embodiments, a jet mixer can be used, for example, to continuously mix the cement composition, including water, as it is being pumped to the wellbore.

Figure 2A:
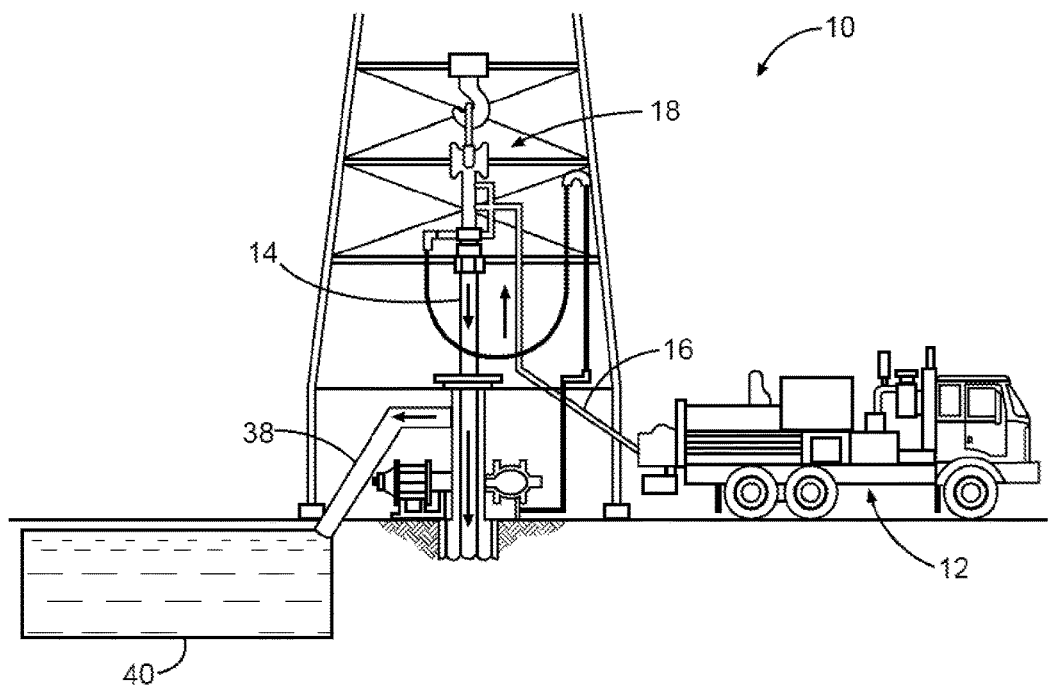
FIG. 2A illustrates surface equipment that may be used in placement of a cement composition into a wellbore.

An example technique and system for introducing the cement composition into a subterranean formation will now be described with reference to FIGS. 2A and 2B. FIG. 2A illustrates surface equipment 10 that can be used to introduce the cement composition. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. The surface equipment 10 can include a cementing unit 12, which can include one or more cement trucks, mixing equipment 4, and pumping equipment 6 (e.g., as depicted in FIG. 1). The cementing unit 12 can pump the cement composition 14 through a feed pipe 16 and to a cementing head 18, which conveys the cement composition 14 downhole.

The method embodiments include the step of introducing the cement composition into the subterranean formation 20. Turning now to FIG. 2B, the cement composition 14 can be introduced into a subterranean formation 20. The step of introducing can include pumping the cement composition into the subterranean formation using one or more pumps 6. The step of introducing can be for the purpose of inhibiting or preventing lost circulation into the subterranean formation. The step of introducing can also include introducing the cement composition into one or more highly-permeable areas within the subterranean formation, such as vugs or fissures. The cement composition can be in a pumpable state before and during introduction into the subterranean formation 20. According to certain embodiments, the subterranean formation 20 is penetrated by a well 22. The well can be, without limitation, an oil, gas, or water production well, an injection well, a geothermal well, or a high-temperature and high-pressure (HTHP) well. According to this embodiment, the step of introducing includes introducing the cement composition into the well 22. The wellbore 22 comprises walls 24. A surface casing 26 can be inserted into the wellbore 22. The surface casing 26 can be cemented to the walls 24 via a cement sheath 28. One or more additional conduits (e.g., intermediate casing, production casing, liners, etc.) shown here as casing 30 can also be disposed in the wellbore 22. One or more centralizers 34 can be attached to the casing 30, for example, to centralize the casing 30 in the wellbore 22 prior to and during the cementing operation. According to other embodiments, the subterranean formation 20 is penetrated by a wellbore 22 and the well includes an annulus 32 formed between the casing 30 and the walls 24 of the wellbore 22 and/or the surface casing 26. According to these other embodiments, the step of introducing includes introducing the cement composition into a portion of the annulus 32.

Figure 2B:
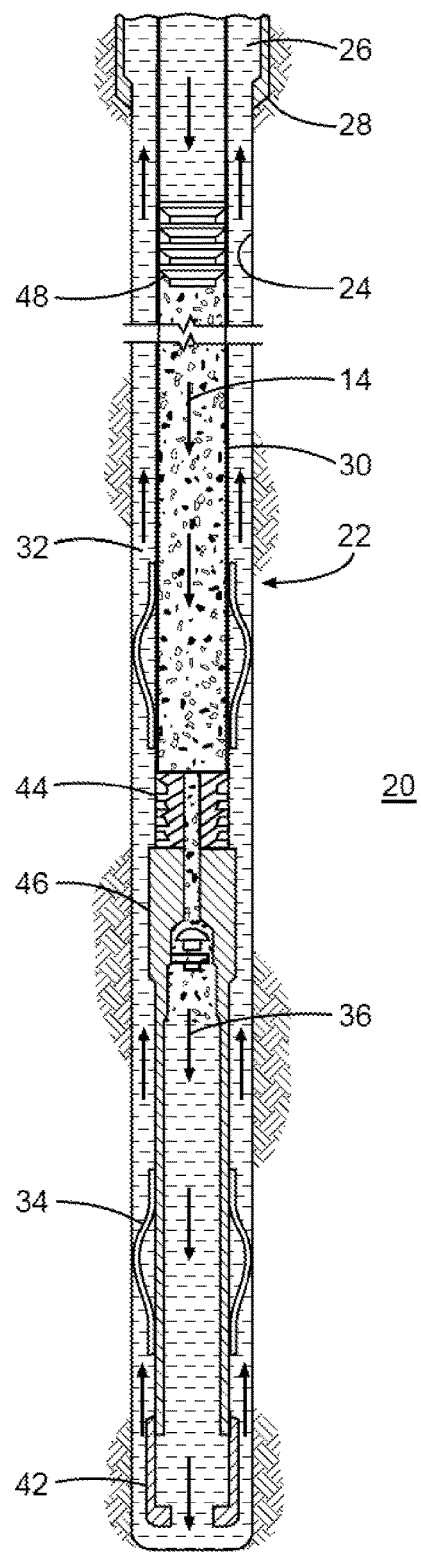
FIG. 2B illustrates placement of a cement composition into an annulus of a wellbore.

With continued reference to FIG. 2B, the cement composition 14 can be pumped down the interior of the casing 30. The cement composition 14 can be allowed to flow down the interior of the casing 30 through the casing shoe 42 at the bottom of the casing 30 and up around the casing 30 into the annulus 32. While not illustrated, other techniques can also be utilized for introduction of the cement composition 14. By way of example, reverse circulation techniques can be used that include introducing the cement composition 14 into the subterranean formation 20 by way of the annulus 32 instead of through the casing 30.

As it is introduced, the cement composition 14 may displace other fluids 36, such as drilling fluids and/or spacer fluids that may be present in the interior of the casing 30 and/or the annulus 32. At least a portion of the displaced fluids 36 can exit the annulus 32 via a flow line 38 and be deposited, for example, in one or more retention pits 40 (e.g., a mud pit), as shown in FIG. 2A. Referring again to FIG. 2B, a bottom plug 44 can be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 can be introduced into the wellbore 22 behind the cement composition 14. The top plug 48 can separate the cement composition 14 from a displacement fluid and also push the cement composition 14 through the bottom plug 44.

The method embodiments also include the step of allowing the cement composition to set. The step of allowing can be performed after the step of introducing the cement composition into the subterranean formation.

The method embodiments also include contacting the set cement composition with an acid. The step of contacting can include introducing the acid into the subterranean formation. The acid can be any acid that dissolves at least the cement of the cement composition. The acid can also be selected such that some or all of any other additives are also dissolved in the acid. By way of example, the acid can be selected from hydrochloric acid, phosphoric acid, and hydrofluoric acid. The acid can be in solution with water. The acid can be in a sufficient concentration in solution such that the percentage of acid solubility of the set cement composition is at least 50%, or alternatively at least 70%, at the bottomhole temperature and pressure of the subterranean formation after being contacted with the acid for 180 min. The acid can also have a concentration in the range of about 5% to about 35% by volume in water. Of course, the exact concentration of the acid will depend on the specific acid used. The acid can also come in contact with the set cement composition for a desired amount of time. The desired amount of time can be sufficient to cause a desired percentage of the set cement composition to dissolve in the acid. The desired percentage can be selected such that fluid communication is restored within the subterranean formation. Accordingly, a sufficient amount of the set cement composition can dissolve and be flowed from the highly-permeable areas where the cement composition was located towards a wellhead of the wellbore. In this manner, fluid communication can be restored through the highly-permeable areas.

Examples

To facilitate a better understanding of the present invention, the following examples of certain aspects of preferred embodiments are given. The following examples are not the only examples that could be given according to the present invention and are not intended to limit the scope of the invention.

For the Tables, cement compositions were prepared and tested according to the specifics for each test in the Detailed Description section above.

Table 1 lists the ingredients for a control cement composition and an acid-soluble cement composition. The cement compositions contained at least cement and water and optionally the following ingredients: SILICALITE™, extender and compressive-strength enhancer; HALAD®-344 fluid loss additive; nano silica set accelerator; and THERMA-VIS™ and/or SA-1015™ viscosifiers—expressed in units of concentration of gallons per sack of the cement (gal/sk), by weight of the cement (bwoc), or % by weight of the water (bwow). As can be seen, the acid-soluble cement composition had about 10 times as much water as the control cement composition. The amount of water decreased the overall density of the acid-soluble composition compared to the control cement.

TABLE 1

| Ingredients | Ctl Cement Comp. | Acid-Soluble Cement Comp. |
|---|---|---|
| Density (ppg) | 15.6 | 10.0 |
| Class G Cement | 100% | 100% |
| Water (gal/sk) | 5.6 | 54.5 |
| SILICALITE ™ (bwoc) | — | 65% |
| HALAD ®-344 (bwoc) | — | 1.5% |
| Nano Silica (gal/sk) | — | 1.5 |
| THERMA-VIS ™ (bwow) | — | 1.5% |
| SA-1015 ™ (bwoc) | 0.1% | 0.1% |

Table 2 lists the percent acid solubility of the cement compositions at various times. Acid solubility testing was performed using a 15% hydrochloric acid solution. As can be seen, the acid soluble cement composition had superior acid solubility compared to the control cement composition. Moreover, the cement composition experienced an 86% acid solubility in 4 hours, which indicates that the majority of, if not all of, the cement composition could be dissolved by the acid.

TABLE 2

| Time (min) | Ctl Cement Comp. | Acid-Soluble Cement Comp. |
|---|---|---|
| 5 | — | 7.4 |
| 10 | — | 14.7 |
| 15 | — | 22.1 |
| 20 | — | 30.3 |
| 40 | — | 42.1 |
| 60 | 2.2 | 51.1 |
| 90 | — | 61.0 |
| 120 | 3.4 | 68.9 |
| 180 | 4.3 | 78.8 |
| 240 | 4.9 | 86.0 |

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
   introducing a cement composition into the subterranean formation, wherein the cement composition comprises:
   (A) cement; and
   (B) water, wherein the water is in a concentration in the range of about 220% to about 800% by weight of the cement thereby yielding a cement composition comprising a density of between about 9 ppg to about 12 ppg without the inclusion of light-weight additives;
   wherein the cement composition is acid soluble;
   allowing the composition to set; and
   contacting the set cement composition with an acid.

2. The method according to claim 1, wherein the cement is selected from the group consisting of Class A cement, Class C cement, Class G cement, Class H cement, and any combination thereof.

3. The method according to claim 1, wherein the cement is selected from the group consisting of Portland cement, Gypsum cement, Joppa cement, Dyckerhoff cement, Slag, cement, high aluminate cements, such as calcium-aluminate cements, calcium magnesia cements, and any combination thereof.

4. The method according to claim 1, wherein the water is selected from the group consisting of freshwater, brackish water, seawater, and saltwater, in any combination thereof in any proportion.

5. The method according to claim 1, wherein the cement composition further comprises a water-soluble salt.

6. The method according to claim 1, wherein the cement composition has a percent acid solubility greater than 45% at a time of 60 minutes in a 15% hydrochloric acid solution.

7. The method according to claim 1, wherein the cement composition has a percent acid solubility greater than 60% at a time of 120 minutes in a 15% hydrochloric acid solution.

8. The method according to claim 1, wherein the percentage of acid solubility of the set cement composition is at least 50% at the bottomhole temperature and pressure of the subterranean formation after being contacted with the acid for 180 minutes.

9. The method according to claim 1, wherein the acid dissolves at least the cement of the cement composition.

10. The method according to claim 9, wherein the acid is selected from hydrochloric acid, phosphoric acid, and hydrofluoric acid.

11. The method according to claim 1, wherein the cement composition inhibits or prevents lost circulation into the subterranean formation.

12. The method according to claim 1, wherein the step of introducing comprises introducing the cement composition into one or more vugs or fissures within the subterranean formation.

13. The method according to claim 1, wherein the acid contacts the set cement composition for a desired amount of time, and wherein the desired amount of time is sufficient to cause a desired percentage of the set cement composition to dissolve in the acid.

14. The method according to claim 13, wherein the desired percentage is selected such that fluid communication is restored within the subterranean formation.

15. The method according to claim 1, wherein the subterranean formation is penetrated by a well.

16. The method according to claim 15, wherein the well is an oil, gas, or water production well, an injection well, a geothermal well, or a high-temperature and high-pressure well.

17. The method according to claim 1, wherein the step of introducing comprises using one or more pumps to pump the cement composition into the subterranean formation.

18. A cement composition for use in a well that penetrates a subterranean formation comprising:
   cement; and
   water, wherein the water is in a concentration in the range of about 220% to about 800% by weight of the cement thereby yielding a cement composition comprising a density of between about 9 ppg to about 12 ppg without the inclusion of light-weight additives, and wherein the cement composition is acid soluble.

* * * * *